(12) United States Patent
Tokuda et al.

(10) Patent No.: US 7,604,590 B2
(45) Date of Patent: Oct. 20, 2009

(54) COMPACT OPTICAL UNIT

(75) Inventors: Kazunari Tokuda, Tokyo (JP); Tadashi Hirata, Tokyo (JP)

(73) Assignee: Olympus Corporation, Tokyo (JP)

( * ) Notice: Subject to any disclaimer, the term of this patent is extended or adjusted under 35 U.S.C. 154(b) by 1297 days.

(21) Appl. No.: 10/459,981

(22) Filed: Jun. 12, 2003

(65) Prior Publication Data

US 2003/0233028 A1 Dec. 18, 2003

(30) Foreign Application Priority Data

Jun. 14, 2002 (JP) ............................. 2002-174475
Apr. 4, 2003 (JP) ............................. 2003-102045

(51) Int. Cl.
*A61B 1/00* (2006.01)
*A61B 1/04* (2006.01)
*A61B 1/06* (2006.01)

(52) U.S. Cl. .................... 600/129; 600/182; 600/160
(58) Field of Classification Search ............... 600/134; 359/198, 201–202, 212–214
See application file for complete search history.

(56) References Cited

U.S. PATENT DOCUMENTS

| 5,716,323 | A | * | 2/1998 | Lee ............................. 600/134 |
| 5,810,714 | A | * | 9/1998 | Takamura et al. ............ 600/134 |
| 5,873,816 | A | * | 2/1999 | Kagawa et al. ............... 600/134 |
| 6,172,789 | B1 | | 1/2001 | Kino et al. |
| 6,292,287 | B1 | * | 9/2001 | Fujinoki ..................... 359/212 |
| 6,319,197 | B1 | * | 11/2001 | Tsuji et al. .................. 600/132 |
| 6,483,626 | B2 | | 11/2002 | Suga |
| 6,545,260 | B1 | * | 4/2003 | Katashiro et al. ......... 250/227.26 |
| 2001/0043383 | A1 | * | 11/2001 | Suga .......................... 359/212 |
| 2002/0018276 | A1 | * | 2/2002 | Suga .......................... 359/212 |

FOREIGN PATENT DOCUMENTS

| JP | 06-300950 | 10/1994 |
| JP | 2000-171726 | 6/2000 |
| JP | 2000-310743 | 11/2000 |
| JP | 2001-147380 | 5/2001 |
| JP | 2001-147398 | 5/2001 |

* cited by examiner

*Primary Examiner*—John P Leubecker
*Assistant Examiner*—Philip R Smith
(74) *Attorney, Agent, or Firm*—Scully, Scott, Murphy & Presser, P.C.

(57) ABSTRACT

A compact optical unit which comprises a light emitting section for emitting a light, a first optical element having a first reflecting section for reflecting a light which is emitted from the light emitting section, a second optical element having a second reflecting section which is disposed to face the first optical element, and a light condensing optical system for condensing a light is formed. The first reflecting section and the second reflecting section are disposed so as to be diagonal to an optical axis of a light which is incident to the first reflecting section and the second reflecting section, a light transmitting section is disposed in the first optical element for transmitting a light which is reflected by the second reflecting section so as to be incident to the light condensing optical system. By disposing the optical element such that a light beam is incident diagonally; therefore, it is possible to propose a compact optical unit having a high SN ratio which can be assembled easily by using a member for supporting the optical unit highly precisely.

11 Claims, 15 Drawing Sheets

A LINE WHICH IS PARALLEL WITH OPTICAL AXIS

FIG. 15A    FIG. 15B
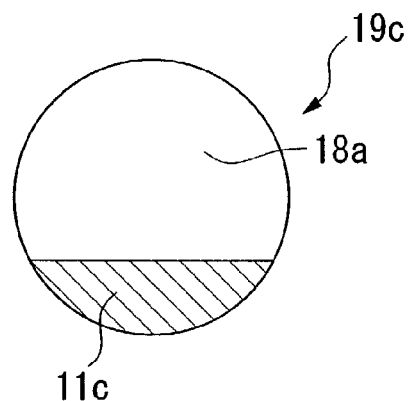 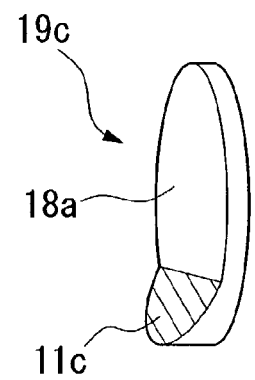
FIG. 16
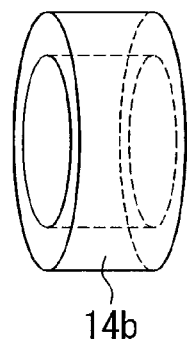
FIG. 17
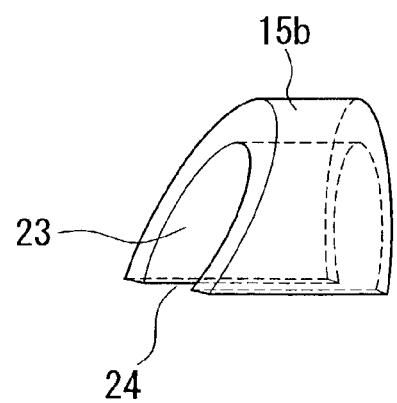

LIGHT
EMITTING SECTION

LIGHT
EMITTING SECTION

COMPACT OPTICAL UNIT

INCORPORATED BY REFERENCE

The present application is based on patent application No. 2003-102045 filed in Japan, the content of which is incorporated herein by reference.

BACKGROUND OF THE INVENTION

1. Field of the Invention

The present invention relates to a compact optical unit. In particular, the present invention relates to a compact optical unit which can be inserted into a channel in an endoscope.

2. Description of Related Art

For a compact confocal optical system which is used in an endoscope, it is possible to categorize two systems generally. One is a side-view optical system in which a longitudinal direction of its probe and a perspective direction do not coincide. The other is a direct-view optical system in which a longitudinal direction of its probe and a perspective direction coincide. However, when a side-view compact confocal optical system probe is used in a channel in a direct-view endoscope, there is a problem in that it is difficult to specify a scope of observation in the confocal optical system. On the other hand, when a direct-view compact confocal optical system probe is used in a channel in a direct-view endoscope, it is possible to see a position of the confocal optical system and a perspective range easily by an objective lens in the endoscope. Also, it is possible to adjust the perspective range of the confocal optical system to any object. Some of the direct-view compact confocal optical system probes which can be inserted to a channel in the endoscope are publicly known (see following patent document).

Japanese Unexamined Patent Application, First Publication No. 2000-171726 (pages 2 to 7, FIG. 1)

SUMMARY OF THE INVENTION

An object of the present invention is to provide a compact optical unit in which high SN-ratio information can be obtained in a Z-optical path in which optical elements are disposed such that a light beam from a light source is incident diagonally, and the compact optical system can be assembled highly precisely.

The present invention provides following device.

A first aspect of the present invention is a compact optical unit which comprises a light emitting section for emitting a light, a first optical element having a first reflecting section for reflecting a light which is emitted from the light emitting section, a second optical element having a second reflecting section which is disposed to face the first optical element, and a light condensing optical system for condensing a light. In the first aspect of the present invention, it is preferable that the first reflecting section and the second reflecting section are disposed so as to be diagonal to an optical axis of a light which is incident to the first reflecting section and the second reflecting section, and a light transmitting section is disposed in the first optical element for transmitting a light which is reflected by the second reflecting section so as to be incident to the light condensing optical system.

A second aspect of the present invention is preferably a compact optical unit which further comprises a second optical element supporting member for supporting the second optical element, a first spacer for supporting the light condensing optical system and the first optical element, a second spacer for supporting the first spacer and the second optical element supporting member, and a cover member for covering the outside of the first spacer and the outside of the second spacer.

A third aspect of the present invention is preferably a compact optical unit in which the light emitting section is a tip of the optical fiber, and the second optical element supporting member supports the optical fiber in a direction diagonal to an axial direction of an outer shape of the second optical element supporting member.

In a fourth aspect of the present invention, it is preferable that the first optical element and the first spacer are formed as a unit.

In a fifth aspect of the present invention, it is preferable that a spacer unit is formed by attaching the first optical element, the first spacer, and the second spacer, and surfaces on both ends of the spacer unit are parallel each other.

In a sixth aspect of the present invention, it is preferable that the first optical element is larger than a total area containing an area of a bundle of light which transmits the first optical element and an area for reflecting a light in the first reflecting section.

In a seventh aspect of the present invention, it is preferable that the light transmitting section in the first optical element is an opening section.

In an eighth aspect of the present invention, it is preferable that the first optical element is formed by parallel flat boards, the first optical element is provided with a cylindrical spacer which is sandwiched between the first optical element and the light condensing optical system, a surface diagonal to the axial line is provided on an end surface of the cylindrical spacer, and the first optical element is fixed on the surface diagonal to the axial line.

In a ninth aspect of the present invention, it is preferable that the first reflecting section is disposed in a part of lenses which form the light condensing optical system.

In a tenth aspect of the present invention, it is preferable that the second reflecting section swings by a driving section which is disposed thereoutside.

In an eleventh aspect of the present invention, it is preferable that the second optical element is connected to a reference potential wiring which supplies a reference potential for the driving section which drives the second reflecting section and an X-axis driving signal wiring and a Y-axis driving signal wiring which supply the driving voltage to each axes, and the cover member is connected to the reference potential wiring.

In a twelfth aspect of the present invention, it is preferable that an optical scanning probe is provided with the compact optical unit on a tip of the optical scanning probe. In this aspect, it is also preferable that the X-axis driving signal wiring and the Y-axis driving signal wiring are connected each other via the reference potential wiring and a resistance.

In a thirteenth aspect of the present invention, it is preferable that an optical scanning probe is provided with the compact optical unit on a tip of the optical scanning probe. Also, in this aspect of the present invention, it is preferable that the optical scanning probe can be inserted in a channel in an endoscope flexibly.

BRIEF DESCRIPTION OF THE DRAWINGS

FIGS. 15A and 15B show structures for the first optical element according to the firth embodiment of the present invention.

FIG. 16 shows a structure for parallel spacers according to the fifth embodiment of the present invention.

FIG. 17 shows a structure for a cylindrical spacer according to the fifth embodiment of the present invention.

DETAILED DESCRIPTION OF THE INVENTION

Detail of a compact optical unit according to embodiments of the present invention is explained with reference to drawings as follows.

Figure 1:
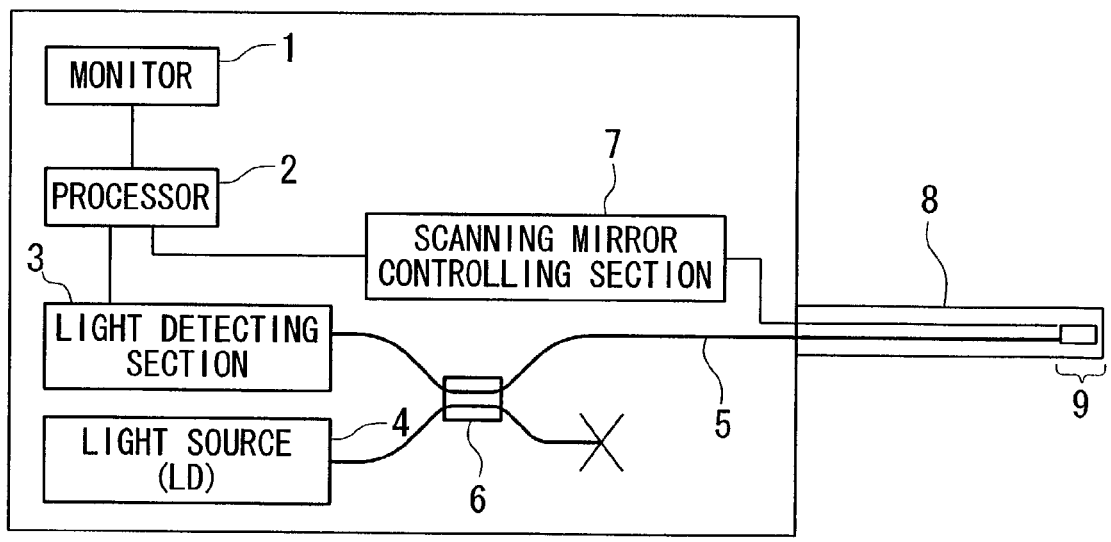
FIG. 1 shows a structure of an endoscope system according to an embodiment of the present invention.

An endoscope system according to the embodiments of the present invention comprises a motor 1, a processor 2, a light detecting section 3, a light source 4, an optical fiber 5, an optical fiber coupler 6, a scanning mirror controlling section 7, an endoscope probe 8, and an endoscope tip section 9 as shown in FIG. 1.

A monitor 1 is a display device for displaying the subject as an image information. The processor 2 is an information processing device which converts an electric signal which is sent from the light detecting section 3 which is explained later to an image information so as to putout the converted image information to the monitor 1. The light detecting section 3 detects an intensity of a light which is reflected by the endoscope tip section 9 and converts the detected light intensity to an electric signal so as to output to the processor 2. Here, for the light detecting section 3, any one of a photo-multi pliers, an avalanche photo-diode, or a photo-diode can be used.

For example, a laser diode can be used for a light source 4. A light which is emitted from the light source 4 is guided to the endoscope tip section 9 via the optical fiber 5. The optical fiber coupler 6 divides a light which is emitted from the light source 4 into two directions and leads a light which returns from the endoscope tip section 9 to the light detecting section 3. A beam splitter can be used so as to realize an equivalent function with the optical fiber coupler 6. The scanning mirror controlling section 7 controls a scanning mirror 12 in the optical unit which is built in the endoscope tip section 9 which is explained later. It is possible to obtain a two dimensional (XY direction) image by scanning the scanning mirror 12 in X direction and Y direction by the scanning mirror controlling section 7. Also, it is possible to obtain a three-dimensional (XYZ direction) image by performing a scanning operation for the endoscope probe 8 in a detth direction (Z direction).

The endoscope probe 8 has an endoscope tip section 9 for containing a compact optical unit. For example, the endoscope probe 8 observes a subject via a small hole which is called as a channel in the endoscope. Also, it may be possible that the endoscope probe 8 is inserted directly in a body of subject such as a human body or other living organisms. Here, detail of the optical unit which is contained in the endoscope tip section 9 is explained in the embodiments of the present invention.

Next, functions of the optical system according to the present invention are explained according to a direction in which a light progresses with reference to FIG. 1. First, a light which is emitted from the light source 4 enters in the optical fiber coupler 6 via the optical fiber 5. The light which is emitted from the light source 4 is divided in two directions at the optical fiber coupler 6. A part of the divided light enters the optical unit which is disposed in the endoscope tip section 9 via the optical fiber 5 again. The light which is emitted from the light source 4 is reflected and condensed in the optical unit. After that, the condensed light is emitted to a living organisms as a subject to be observed. The returning light which is reflected by the subject follows the same path as the above explained path so as to enter the optical fiber coupler 6; thus, the returning light is guided to the light detecting section 3.

The light detecting section 3 detects the intensity of the returning light as explained above. After the light detecting section 3 converts the detected light intensity to an electric signal, the light detecting section 3 outputs the converted electric signal to the processor 2. After the processor 2 processes the inputted electric signal so as to covert the electric signal to an image information, the processor 2 puts out the image information to the monitor 1 so as to display the image so as to observe it. Here, a structure of the light detecting section 3 is not limited to the above structure. It is possible to use a detecting method making use of an optical interference in which a light source such as a Super Luminescent Diode (hereinafter called a SLD) which uses a low coherence such as no longer than 100 μm and an interference signal is obtained only under condition that a length of optical paths coincide in the signal which is observed and the signal which is referred.

Figure 2:
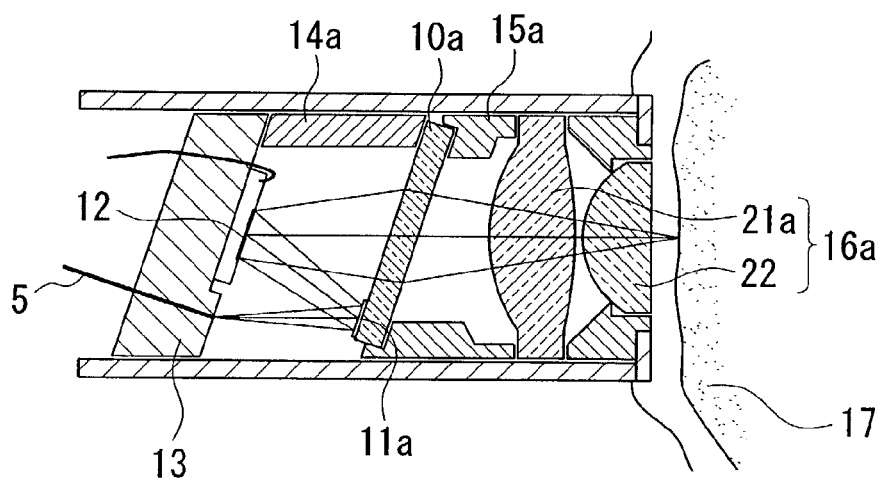
FIG. 2 is a cross section of an optical unit according to a first embodiment of the present invention.
Figure 3A:
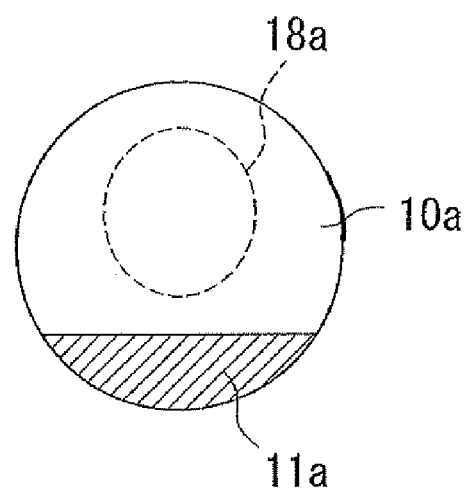
FIGS. 3A to 3C show structures of parallel flat boards according to the first embodiment of the present invention.
Figure 3B:
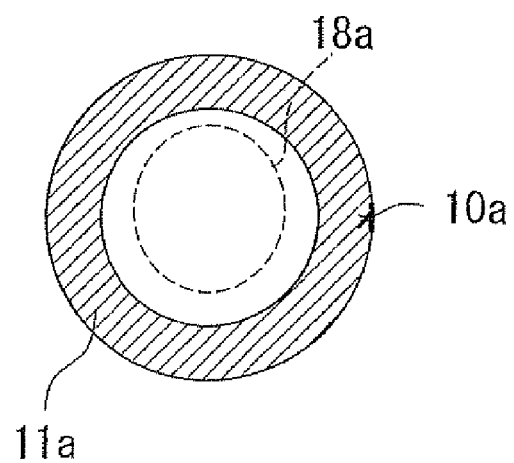
Figure 3C:
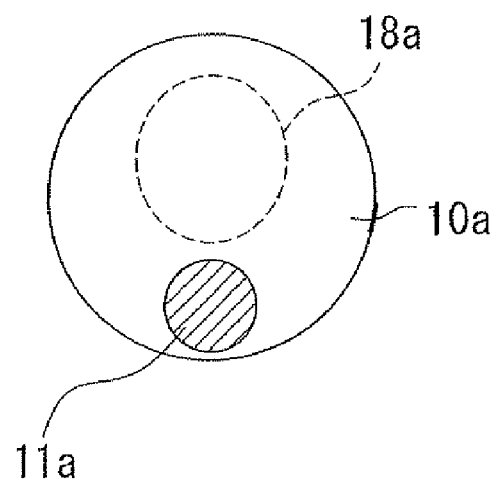

Next, a compact optical unit according to the first embodiment of the present invention which is contained in the endoscope tip section is explained with reference to FIGS. 2 to 7. FIG. 2 shows a cross section viewed in an optical axis direction of the optical unit according to the present embodiment which is contained in the endoscope tip section 9. According to FIG. 2, the optical unit according to the first embodiment is formed by a light condensing optical system 16a which comprises an optical fiber 5, parallel flat board 10a (first optical element), a fixed mirror section 11a (first reflecting section), a scanning mirror 12 (second optical element (including the second reflecting section 12a)), a scanning mirror supporting member 13, parallel spacer 14a (second spacer), a cylindrical spacer 15a (first spacer), a lens 21a, and a lens 22.

An end surface of the optical fiber 5 serves as a pin hole in the optical system which is formed in the optical unit according to the present invention. This means that the end surface serves as a spotlight and a spot-detecting device. As a result, the optical system forms a confocal optical system. The parallel flat board 10a is a columnar optical element which has a flat sections which are parallel with each other. The parallel flat board 10a is provided with a light transmitting section 18a and the fixed mirror section 11a in a unitary manner (see FIG. 3). A coating for preventing a stray light is formed on the light transmitting section 18a for improving a light transmitting ratio and preventing a stray light. A area where the above coating is formed coincides approximately an area of a light bundle which transmits the coated area. Also, a coating for reflecting a light is formed on the fixed mirror section 11a. Here, a member for a reflecting coating, an aluminum member, a metal member, a dielectric multi-layer film can be used.

Figure 4:
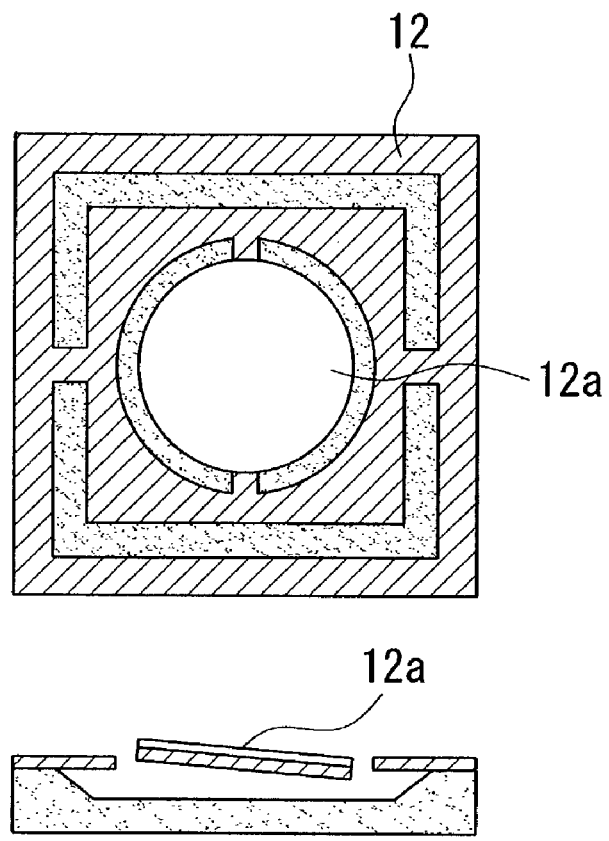
FIG. 4 shows a structure of a scanning mirror according to the first embodiment of the present invention.

The scanning mirror 12 has the second reflecting section 12a in the center of the scanning mirror 12 as shown in FIG. 4. The second reflecting section 12a is supported so as to freely swing around at least an axis. In order to realize a compact device, a static driving method which make use of a Gimbal structure is preferable for a driving method for the scanning mirror 12. Here, a method which is disclosed in a Japanese Unexamined Patent Application, First Publication No. 2000-310743 can be used for supporting a scanning mirror 12 and driving a static driving mirror. The scanning mirror supporting member 13 supports the scanning mirror 12 under parallel condition with the parallel flat board 10a. Also, the scanning mirror supporting member 13 supports an end surface of an light emitting section in the optical fiber 5 so as to be parallel with a surface in which the scanning mirror 12 is supported. An outer diameter of the scanning mirror supporting member 13 is approximately the same as an inner diameter of the endoscope tip section 9.

Figure 21:
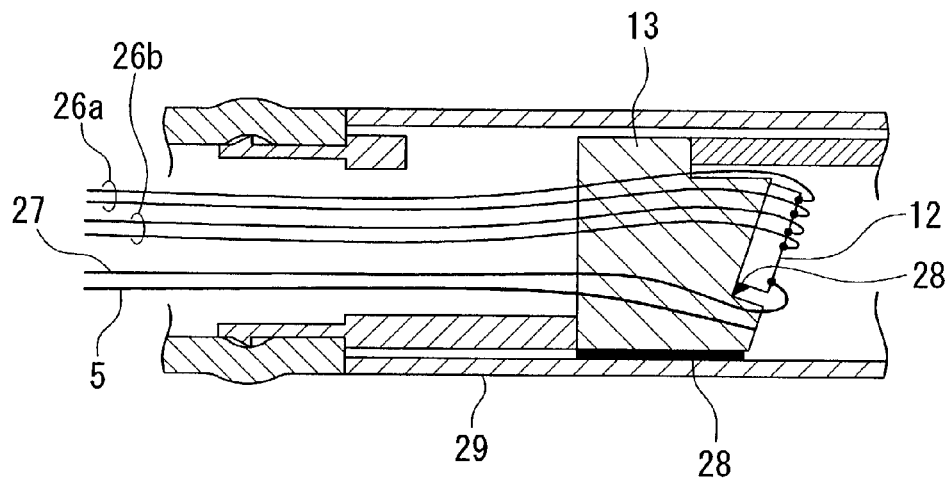
FIG. 21 shows an example of electric wirings in a scanning mirror according to embodiments of the present invention.

For an electric structure for driving the scanning mirror 12, two driving signal wirings 26a, 26b for transmitting signals which is supplied from a driving device thereoutside and drives the scanning mirror 12 in the X direction and the Y direction and a reference potential wiring 27 for supplying a reference potential are connected to the scanning mirror 12 as shown in FIG. 21. Also, the scanning mirror 12 and the scanning mirror supporting member 13 are connected by a conductive bonding agent 28. Also, the scanning mirror supporting member 13 and a cover member 29 are connected by the conductive bonding agent 28. Therefore, the reference potential which is supplied to the scanning mirror 12 is applied to the cover member 29 via these conductive bonding agent 28, and the potential at the cover member 29 is a reference potential.

Figure 22:
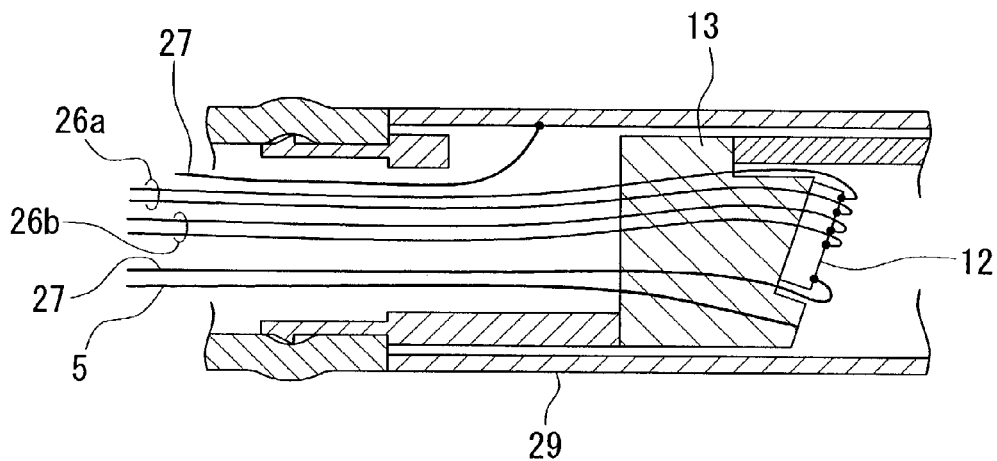
FIG. 22 shows an example of electric wirings in a scanning mirror according to embodiments of the present invention.
Figure 23:
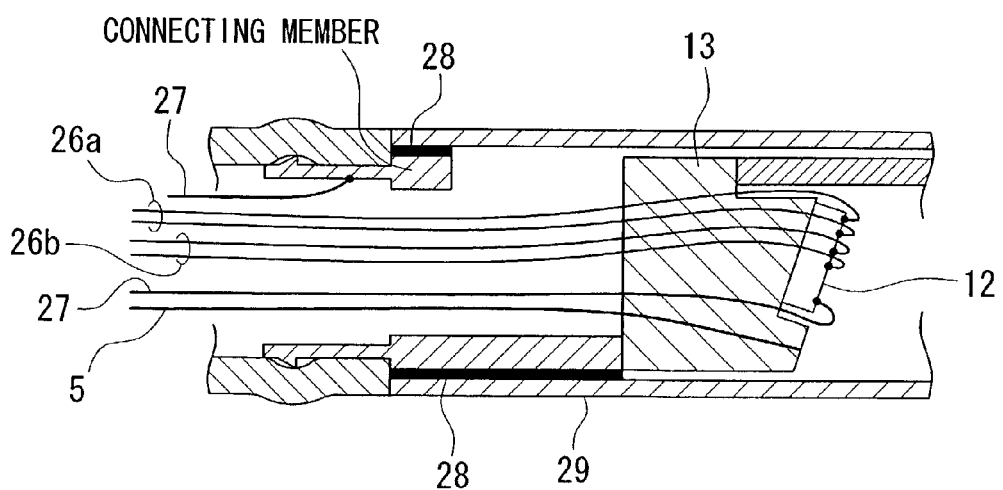
FIG. 23 shows an example of electric wirings in a scanning mirror according to embodiments of the present invention.

Also, for a second electric structure, the reference potential wiring 27 is connected to the scanning mirror 12 and the cover member 29 directly as shown in FIG. 22. Furthermore, for a third electric structure, the reference potential wiring 27 is connected to the scanning mirror 12 and the connecting member directly. Here, the scanning mirror supporting member 13 and the connecting member are connected via the conductive bonding agent 28 such that the potential is common. Here, two driving signals are sine wave signals in which phases are different by 180°. The mirror is driven by making use of the static electricity by supplying these signals to the scanning mirror 12. Here, the potential in the cover member 29 is the reference potential; thus, it is possible to remove an electromagnetic wave noise effectively so as to stabilize the function in the second optical element.

Figure 24:
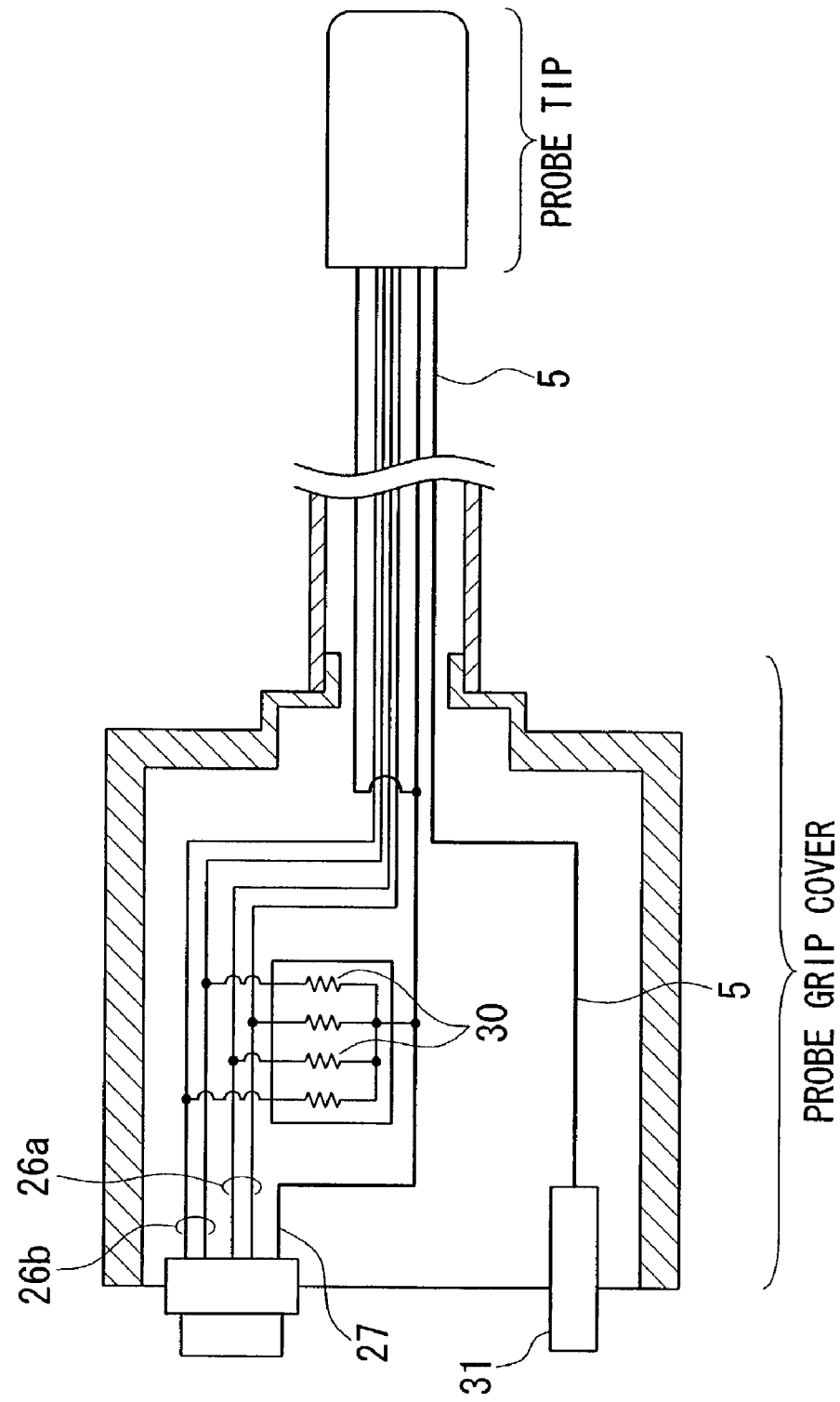
FIG. 24 shows an example of electric wirings in a scanning mirror according to embodiments of the present invention.

More specifically, a structure of a circuit is formed such that a resistance is inserted between two driving signal wirings in the X direction and the Y direction for transmitting signals which is supplied from a driving device thereoutside and the reference potential wiring as shown in FIG. 24. A resistance which is inserted protects the second optical element electrically. Affection due to the static electricity can be prevented effectively by inserting the resistance; thus, it is possible to prevent the second optical element from being broken by the static electricity or the like. Here, this circuit is disposed in a probe grip cover as shown in FIG. 24. Thus, there is a sufficient space thereinside and it is possible to prevent the affection caused by the static electricity while a probe is stored separately from the electric circuit for the driving device.

Figure 5:
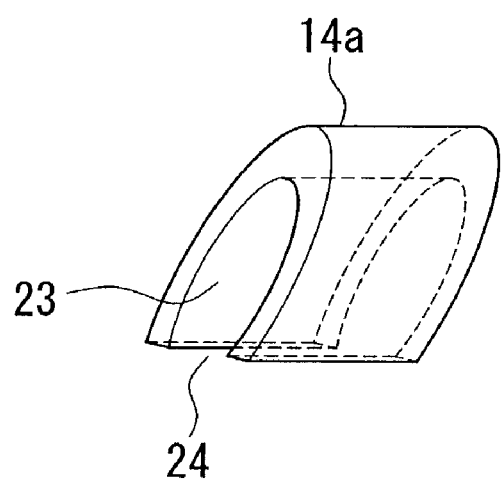
FIG. 5 shows a structure of a parallel spacers according to the first embodiment of the present invention.
Figure 6:
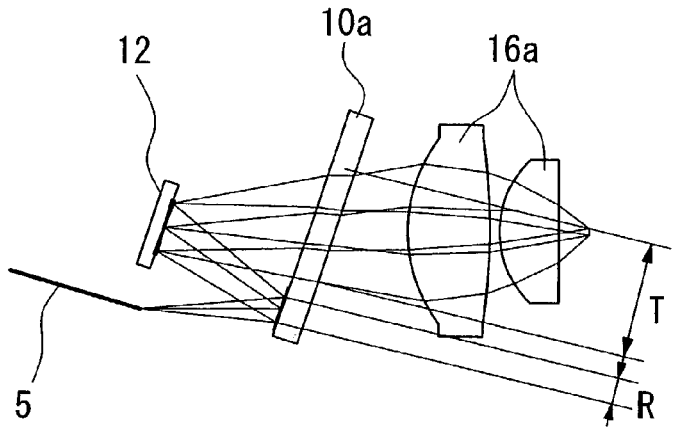
FIG. 6 shows a area for a light bundle which transmits on the parallel flat boards in an area in which the scanning mirror freely moves according to the first embodiment of the present invention.
Figure 7:
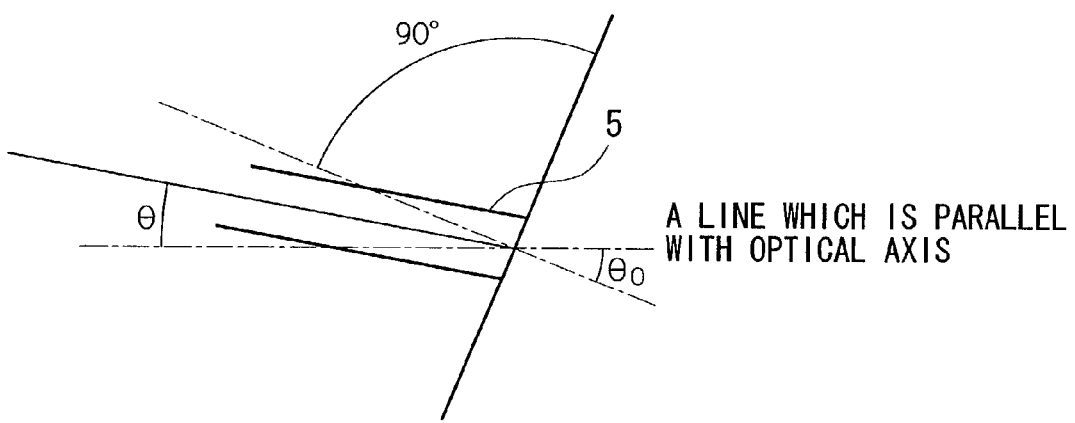
FIG. 7 shows a relationship between an angle of a light emitting end surface of an optical fiber and an optical axis according to the first embodiment of the present invention.

The parallel spacer 14a disposes the scanning mirror supporting member 13 and the parallel flat board 10a in a parallel manner. The parallel spacer 14a is formed by a part of cylindrical member having U-shape as shown in FIG. 5. Both end surfaces of the parallel spacer 14a are parallel. A hollow part in the parallel spacer 14a is formed so as to have an opening section 23 which dies not interfere the light bundle and a notched section 24. Also, the cylindrical spacer 15a supports the parallel flat board 10a and the lens 21a in the light condensing optical system 16a. The cylindrical spacer 15a is formed in approximate cylinder. Furthermore, the cylindrical spacer 15a has an opening section such that the opening section does not block a light bundle between the second reflecting section 12a and the light condensing optical system 16a. Also, the cylindrical spacer 15a has an inclined surface according to an axial direction on an end surface and a surface orthogonal to the optical axis on another end surface. An outer diameter of the cylindrical spacer 15a is approximately the same as an inner diameter of the endoscope tip section 9. The light condensing optical system 16a condenses a light bundle which transmits the parallel flat board 10a on a surface 17 of a subject. The light condensing optical system 16a is formed by the lens 21a and the lens 22. Here, in the lens 21a according to the first embodiment, a flat section which is orthogonal to an optical axis is formed outside of a range in which the light bundle transmits.

Figure 33:
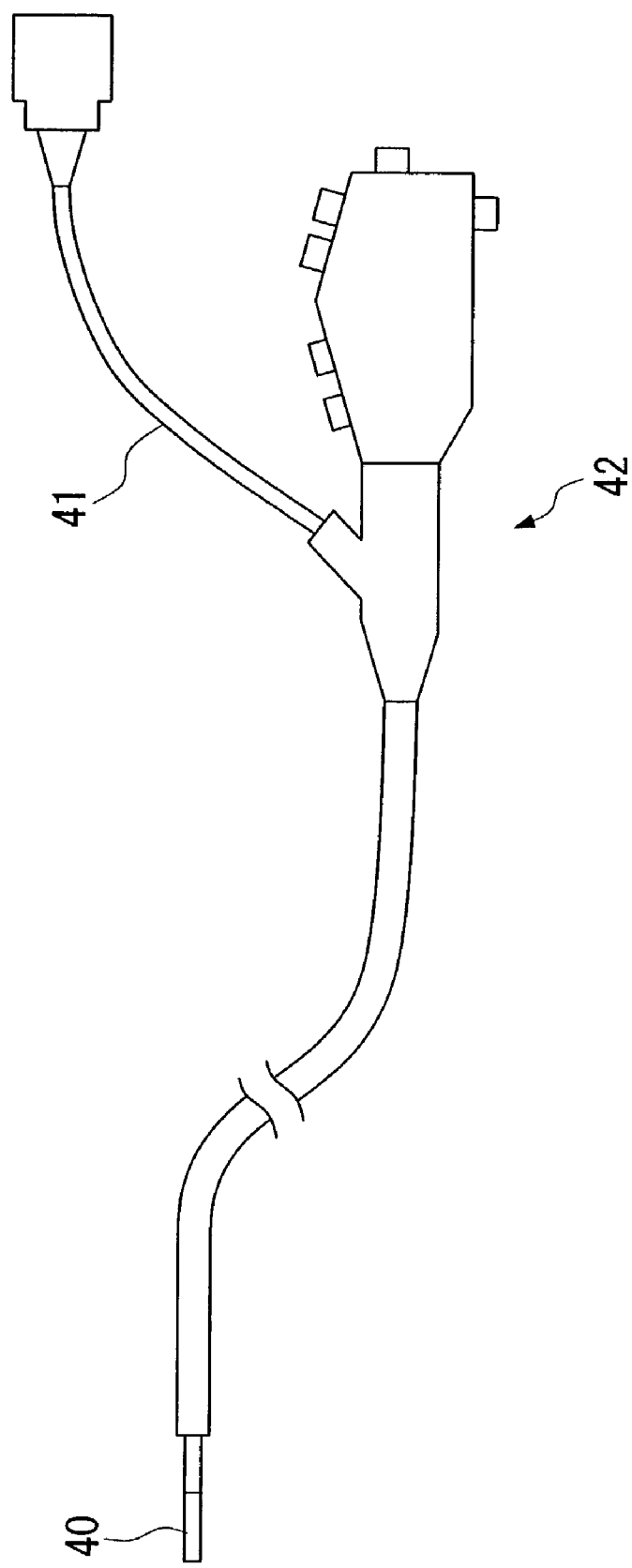
FIG. 33 is a grand view for an optical scanning probe.

An optical unit according to the present embodiment is a compact optical unit having 1 mm to 3 mm diameter of outer probe diameter which is contained in the endoscope tip section 9 as shown in FIG. 33. The probe tip section can be inserted in a channel in the endoscope and the probe tip section has a flexible structure in that the entire probe tip can be folded freely. In the optical system in the optical unit, the optical fiber 5 which serves as a light source and the scanning mirror 12 are supported by the scanning mirror supporting member 13. In addition, an end surface of the light emitting section in the optical fiber 5 is formed so as to be parallel with the scanning mirror 12. That is, the end surface in the light emitting section in the optical fiber 5 is disposed so as to be diagonal according to a central axis of the optical fiber 5. By doing this, it is possible to prevent a light which is reflected on the end surface of the light emitting section in a Fresnel manner from returning to the light detecting section.

Furthermore, in the optical unit according to the present invention, the optical fiber 5 is disposed so as to be diagonal to the optical axis by an angle θ so as to dispose an optical axis which is directed from the optical fiber 5 to the fixed mirror section 11a and an optical axis which is directed from the second reflecting section 12a to the parallel flat board 10a parallel with each other. The angle θ satisfies a following formula.

$$n \cdot \sin(\theta 0 - \theta) = \sin \theta 0 \quad \text{(formula F1)}$$

Figure 25:
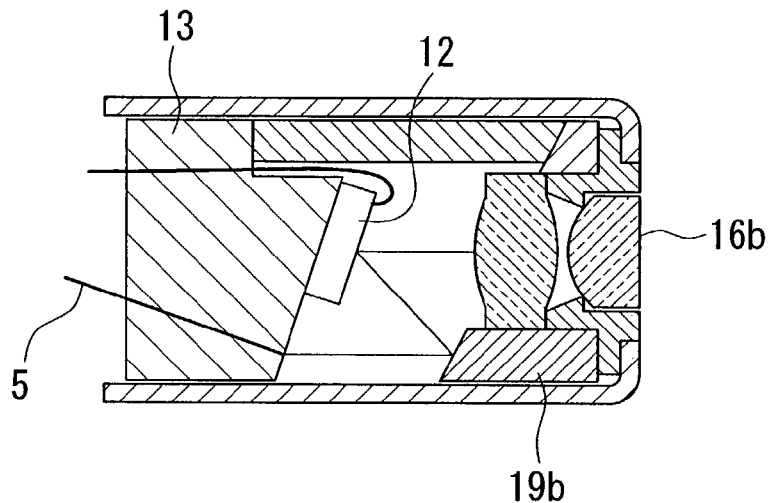
FIG. 25 shows an modified example of the embodiments according to the present invention.

Here, "n" indicates a refractive index in a core of the optical fiber. "θ0" indicates an angle made between a normal on the end surface of the optical fiber and the optical axis. Thus, in the present embodiment, a hole which has a predetermined angle θ to the optical axis is formed on the scanning mirror supporting member 13. The optical fiber 5 is inserted through this hole so as to be bonded each other. After that, the bonded optical fiber 5 and a surface of the scanning mirror supporting member 13 are ground together. By doing this, such a formula is satisfied. Here, in the present embodiment, the conditions such as θ0=18°, n=1.458, θ=5.76°. Also, as shown in FIG. 25, a surface of the scanning mirror 12 and the end surface of the optical fiber are disposed so as to be attached together, it is possible to form such a structure and realize a improved surface finish.

Also, the scanning mirror 12 is supported by the scanning mirror supporting member 13 such that the second reflecting section 12a and a surface of the scanning mirror supporting member 13 are disposed in parallel in the scanning mirror 12. Also, the parallel spacer 14a is disposed between the scanning mirror supporting member 13 and the parallel flat board 10a. On the other hand, another surface of the parallel flat board 10a is supported on an inclined surface on the cylindrical spacer 15a. In the present embodiment, the scanning mirror 12 is produced in a semiconductor manufacturing process. The parallelism between a back surface of the mirror 12 and a surface (second reflecting section 12a) of the scanning mirror 12 is maintained highly precisely. Thus, it is possible to dispose the end surface of the light emitting section of the optical fiber 5 and a surface (near the subject to be observed) of the scanning mirror supporting member 13 and a surface of the scanning mirror 12 in parallel relationship by disposing the scanning mirror 12 so as to be attached to the scanning mirror supporting member 13 closely.

Also, the scanning mirror supporting member 13 is relatively a large member having an outer diameter which is approximately the same as an inner diameter of the endoscope tip section 9; therefore, the scanning mirror supporting member 13 has a sufficient size for forming a parallel flat surface highly precisely. Furthermore, the parallel flat board 10a is larger than a total area of an area for a light bundle and an effective area in the reflecting section; thus, such a parallel flat board 10a is sufficiently large for maintaining a parallelism of the surfaces highly precisely (See FIG. 6: In this drawing, "T" indicates a length of the parallel flat board 10a which corresponds to an area of the light bundle which transmits through the parallel flat board. "R" indicates an effective area in the first reflecting section the parallel flat board 10a as a length).

In the optical unit according to the present embodiment, these members are disposed via the parallel spacer 14a having parallel surfaces each other; therefore, it is realized that the scanning mirror supporting member 13 and the parallel flat board 10a are disposed in parallel. Therefore, by doing this, the end surface for emitting a light of the optical fiber 5 and the second reflecting section 12a in the scanning mirror 12 and a surface of the scanning mirror supporting member 13 are disposed in parallel; thus, the parallel flat board 10a having the fixed mirror section 11a and the second reflecting section 12a are disposed in parallel.

Furthermore, a lens 21a for forming a light condensing optical system 16a is fixed on another surface of the cylindrical spacer 15a which is orthogonal to the optical axis. The lens 21a is formed in a molding operation and has a surface which is precise flatness which is orthogonal to the optical axis. The cylindrical spacer 15a which contacts the lens 21a closely has an outer diameter which is approximately the same as an inner diameter of the endoscope tip section 9; thus, the cylindrical spacer 15a has a sufficient size for an orthogonal flat surface highly precisely. In the present embodiment, an angle of the lens 21a is maintained highly precisely to the optical axis of the light condensing optical system by the above structure. Here, in the present embodiment, an angle of a normal at the parallel flat board 10a to the optical axis in the light condensing optical system and an angle of a normal at a balancing position of the scanning mirror 12 are 18° respectively.

By the above structures, in the optical system in the optical unit according to the present embodiment, it is possible to dispose an optical axis which is directed from an end surface for emitting a light in the optical fiber 5 to the fixed mirror section 11a in the parallel flat board 10a and an optical axis which is directed from the reflecting section 12a to the light condensing optical system 16a in parallel. That is, a light which is emitted from a light source 4 such as a laser diode which is disposed thereoutside shown in FIG. 1 is transmitted in the optical fiber 5 and emitted from the end surface of the optical fiber 5. After that, the light is reflected at the fixed mirror section 11a in the parallel flat board 10a.

Here, the reflected light is reflected again at the second reflecting section 12a in the scanning mirror 12. After the light transmits through the light transmitting section 18a in the parallel flat board 10a, the light is condensed on the subject 17 which is observed by the light condensing optical system. The light which is condensed on the subject 17 is reflected and progresses in the above path reversely; thus, the light is introduced to the optical fiber 5. The light is processed in the light detecting section 3 which is disposed thereoutside as shown in FIG. 1 or a processor 2 so as to be an information image. The obtained information image is displayed on a monitor 1 or the like.

In the optical system in the optical unit according to the present embodiment, an end surface of the optical fiber serves as a pin hole which forms a spotlight; therefore, there is a returning light only from a focused area. Therefore, similarly to a conventional case for a confocal optical system, it is possible to observe a subject by sectioning a particular scope optically by making use of a resolution capability in the optical axis direction without slicing a living organisms as a subject. Also, the parallel flat board 10a is formed by the light transmitting section 18a and the first reflecting section which is coated for reflecting a light as explained above; therefore, a conventional problem in that a notched section is formed near the mirror when another fixed mirror is disposed does not occur. Therefore, there is an advantage in that it is possible to form each member in compact size.

Also, in the optical system in the optical unit according to the present embodiment, the fixed mirror section 11a and the scanning mirror 12 are disposed such that a light is incident diagonally as explained above. In addition, an optical axis which is directed from the end surface of the optical fiber 5 for emitting a light to the fixed mirror section 11a in the parallel flat board 10a and an optical axis which is directed from the second reflecting section to the light condensing optical system 16a are disposed in parallel. By doing this, there are few returning lights from the fixed mirror section 11a and the second reflecting section 12a in the scanning mirror 12. Also, a coating for reflecting a light is formed in an area in the parallel flat board 10a through which a light transmits; therefore, there are few returning light from this area. Therefore, it is possible to realize a direct-view confocal optical system which has low noise by the effects due to the above structure.

Furthermore, the scanning mirror supporting member 13, the parallel spacer 14a, and the cylindrical spacer 15a are formed so as to be the same as an inner shape of the endoscope tip section 9. In addition, the scanning mirror supporting member 13 is formed so as to have sufficient large contacting surface with the optical elements such as the parallel flat board 10a, the light condensing optical system 16a, and the likes; therefore, it is possible to realize a direct-view confocal optical system which can be assembled highly precisely.

Figure 8:
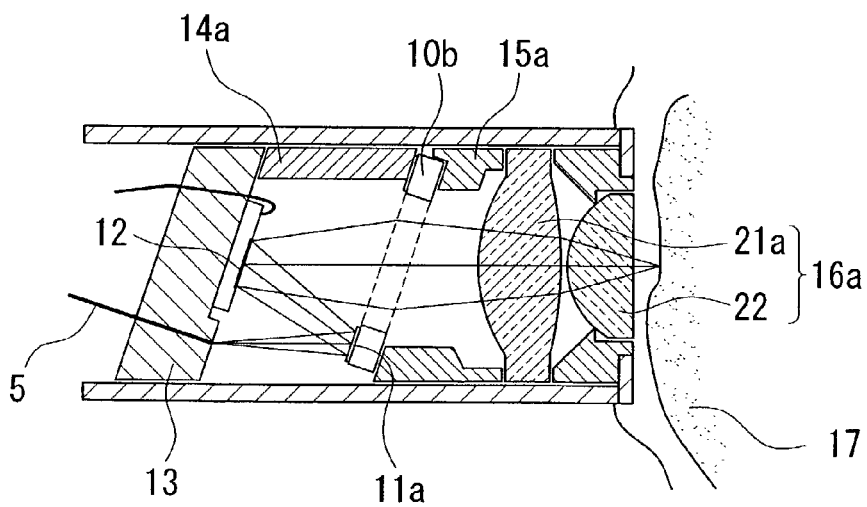
FIG. 8 is a cross section of an optical unit according to a second embodiment of the present invention.

Next, second embodiment of the present invention is explained. FIG. 8 is a cross section of an optical unit which is contained in the endoscope tip section viewed in an optical axis direction according to the present embodiment. According to FIG. 8, the optical unit according to the present embodiment is different from the first embodiment in that an opening section 18b is formed on the parallel flat board 10b. Hereinafter, the same reference numerals are applied to corresponding members as shown in the first embodiment so as to omit the repeated explanation thereof.

Figure 9A:
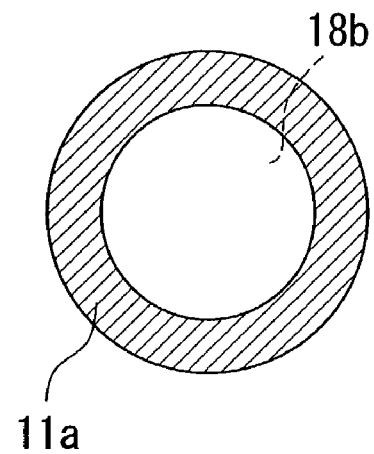
FIGS. 9A to 9C show structures for parallel flat boards according to the second embodiment of the present invention.
Figure 9B:
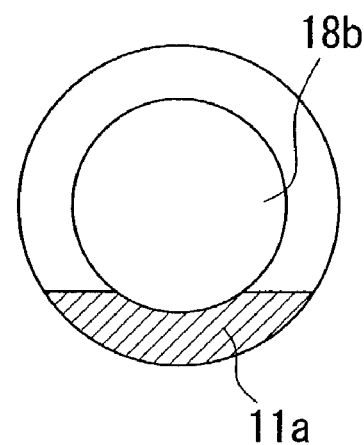
Figure 9C:
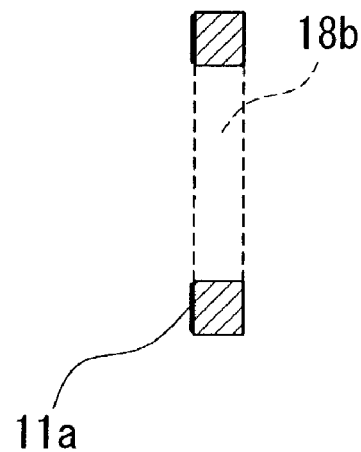

If an opening section 18b is formed on the parallel flat board 10a (see FIG. 9C) according to the first embodiment, such a structure forms a parallel flat board 10b. By doing this, a light does not progress in the subject; thus, a light does not refract as a general principle. Therefore, it is possible to prevent a comatic aberration. Therefore, it is possible to realize an optical system which has a high numerical aperture (hereinafter called high NA) and a high resolution capability. Here, although a structure of the parallel flat board 10b is different from a structure of the parallel flat board 10a, a method for supporting the parallel flat board and a relationship with each optical element are the same as those explained in the first embodiment.

Figure 10:
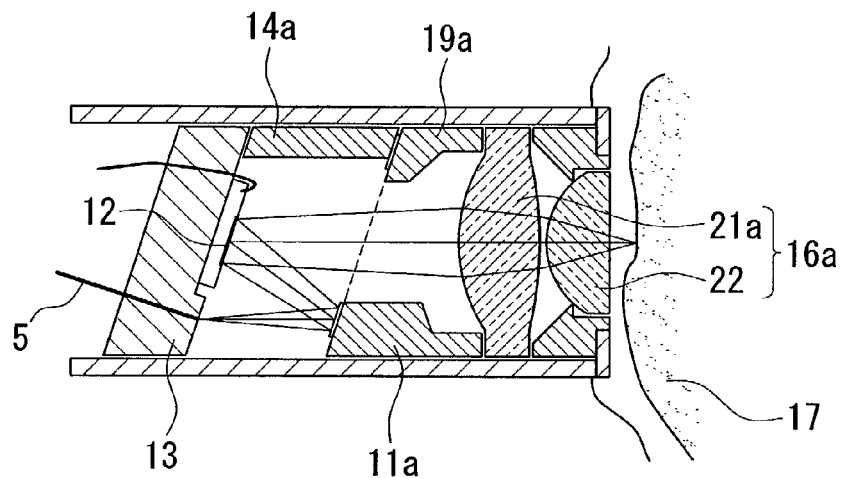
FIG. 10 is a cross section of an optical unit according to a third embodiment of the present invention.

Next, a third embodiment according to the present invention is explained. FIG. 10 is a cross section of an optical unit which is contained in the endoscope tip section viewed in an optical axis direction according to the present embodiment. According to FIG. 10, the optical unit according to the present embodiment is characterized in that the cylindrical spacer 15a is modified such that a first reflection section 11a is formed on a surface which is inclined to an axial direction which in a cylindrical structure of the optical unit. By doing this, it is possible to omit the parallel flat board 10a which is used in the first embodiment. Such a feature is explained in detail as follows with reference to FIGS. 10 and 11. Hereinafter, the same reference numerals are applied to corresponding members as shown in the first embodiment so as to omit the repeated explanation thereof.

Figure 11:
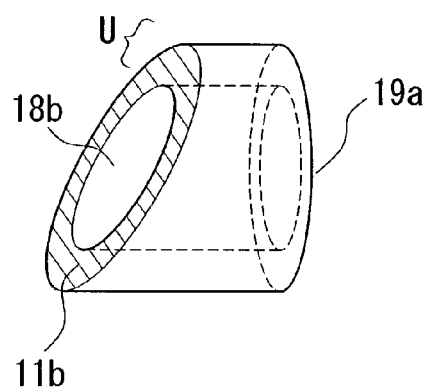
FIG. 11 is a cross section of a first optical element according to the third embodiment of the present invention.

In the present embodiment, a coating for reflecting a light is formed on the first optical element 19a except the opening section 23 on an inclined surface of the first optical element 19a (see FIG. 11). The present embodiment is different from the first embodiment in that the parallel flat board 10a is omitted. Therefore, it is possible to reduce members for forming the optical unit and improve the efficiency for assembling the optical unit while restricting a non-uniformity in disposition angle for each optical element. Here, as similar to a case of the second embodiment, the light transmitting section 18b is an opening section; thus, it is possible to prevent a comatic aberration on the subject 17.

Figure 12:
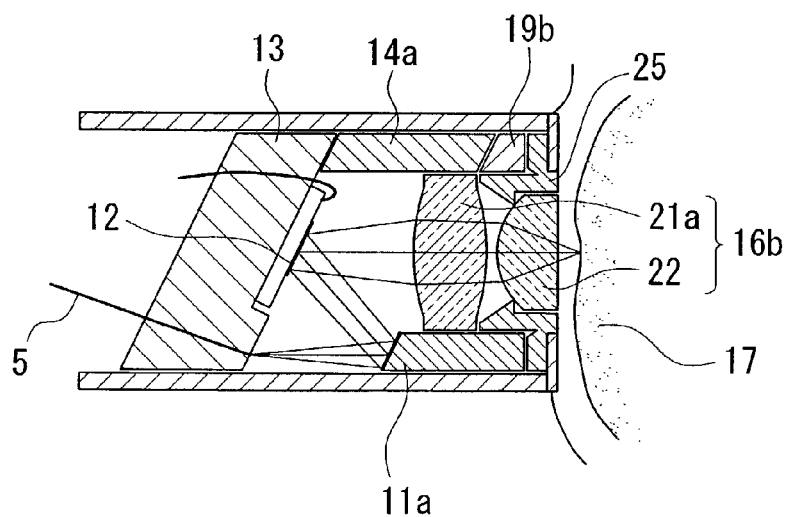
FIG. 12 is a cross section for an optical unit according to a fourth embodiment of the present invention.
Figure 13A:
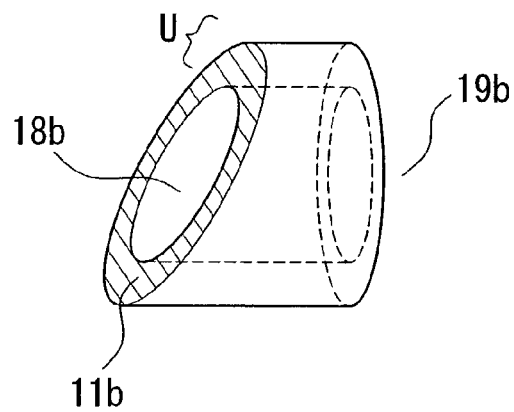
FIGS. 13A and 13B show structures for the first optical element according to the fourth embodiment of the present invention.
Figure 13B:
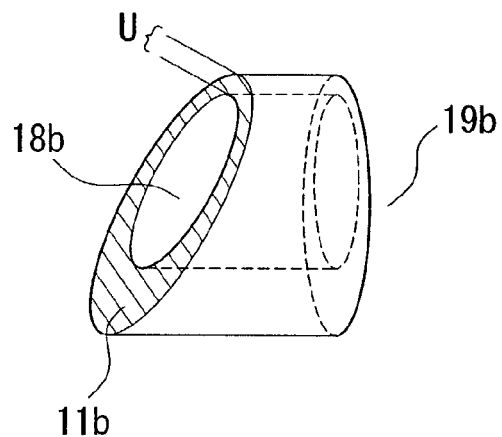

Next, a fourth embodiment of the present invention is explained. FIG. 12 is a cross section of an optical unit which is contained in the endoscope tip section viewed in an optical axis direction according to the present embodiment. According to FIG. 12, the optical unit according to the present embodiment is different from the first embodiment in that the parallel flat board 10a and the cylindrical spacer 15a are formed unitarily so as to form the first optical element, and furthermore, a part of a lens which forms the light condensing optical system 16b is contained in the first optical element 19b. Such a structure is explained in detail with reference to FIGS. 12 and 13 as follows. Hereinafter, the same reference numerals are applied to corresponding members as shown in the first embodiment so as to omit the repeated explanation thereof.

According to the present embodiment, the first optical element 19b contains the lens 21b which forms the light condensing optical system 16b in the first optical element 19b. Also, an outer periphery of the lens 21b and a curved surface in the opening section 23 in the first optical element 19b fit together. Furthermore, the present embodiment is characterized in that a frame for supporting the first optical element 19b and the lens supporting member 25 for supporting the lenses 21b and 22 which form the light condensing optical system 16b are formed in a unitary structure. Here, in the present embodiment, an angle of a normal which is formed on the first optical element 19b to the optical axis in the light condensing optical system is 25°. Also an angle of a normal which is formed in a balancing position of the scanning mirror 12 to the optical axis in the light condensing optical system is also 25°.

The present embodiment is different from the first embodiment in that the parallel flat board 10a is omitted; therefore, it is possible to reduce members for forming the optical unit and improve the efficiency for assembling the optical unit while restricting non-uniformity in the disposition angles for the optical elements. Also, the first optical element 19b contains the lens 21b which forms the light condensing optical system 16b. Also, an outer periphery of the lens 21b and a curved surface in the opening section 23 in the first optical element 19b fit together; therefore, it is possible to position the lens 21b and the opening section 23 highly precisely. Furthermore, the frame for supporting the first optical element 19b and the lens supporting member 25 for supporting the lenses 21b and 22 which form the light condensing optical system 16b are formed in a unitary structure; therefore, it is possible to determine the relative position for these members highly precisely. Here, similarly to a case of the second embodiment, the light transmitting section 18b is an opening section; thus, it is possible to prevent a comatic aberration on the subject 17.

Figure 28:
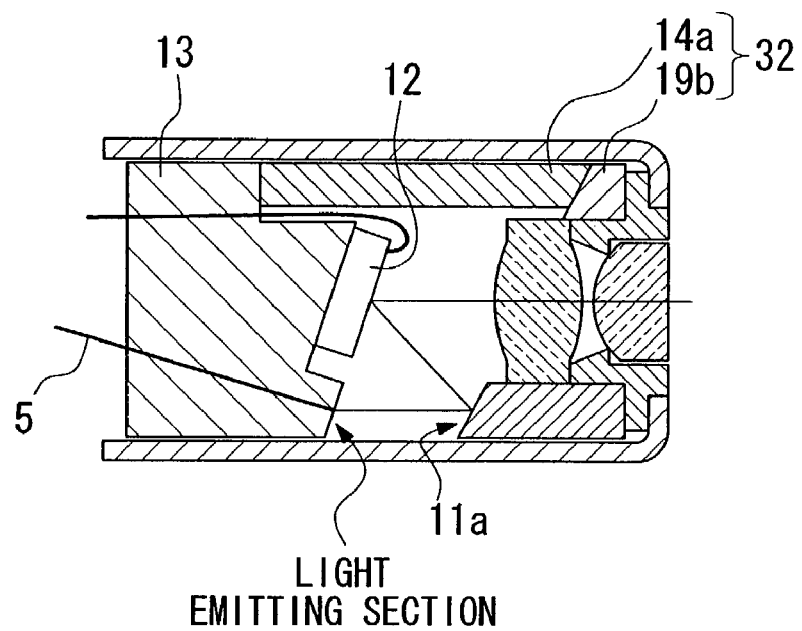
FIG. 28 shows a modified example for a spacers according to the fourth embodiment of the present invention.
Figure 29:
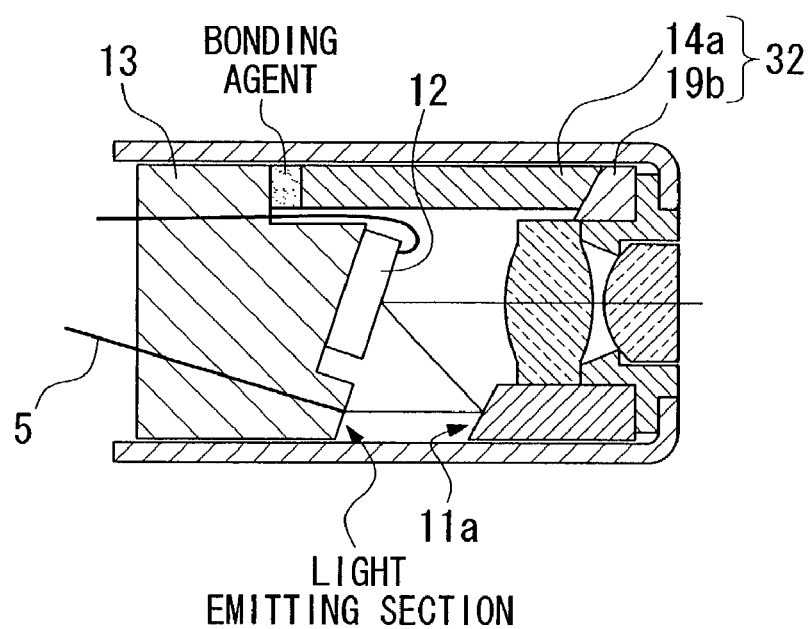
FIG. 29 shows a modified example for a spacers according to the fourth embodiment of the present invention.
Figure 30:
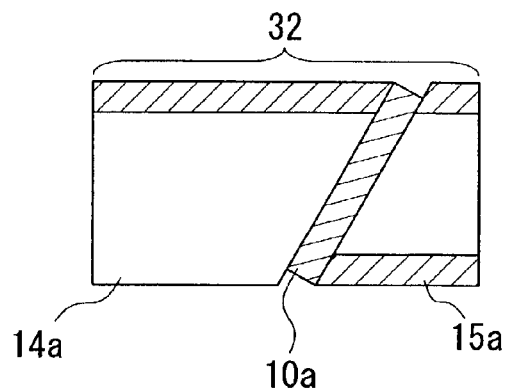
FIG. 30 shows an example for a structure of a spacers according to the fourth embodiment of the present invention.
Figure 31:
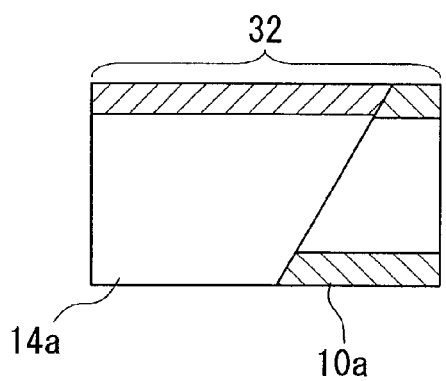
FIG. 31 show a structure for a spacer unit according to the fourth embodiment of the present invention.
Figure 32:
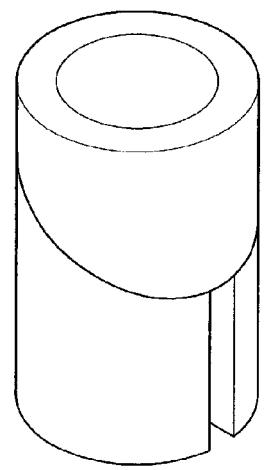
FIG. 32 is a perspective view for the spacer unit according to the fourth embodiment of the present invention.

For a modified example of the fourth embodiment, it may be acceptable that the first optical element 19b and the second spacer 14a are formed unitarily so as to form a spacer unit 32 as shown in FIG. 28. That is, among the optical unit which is formed by the second spacer 14a, the first optical element 19b, and the first spacer 15a as shown in FIG. 30, the first optical element 19b serves as the first spacer 15a and the first optical element 19b and the second spacer 14a are formed unitarily as shown in FIG. 31. Here, it is preferable that the surfaces at both ends of the spacer unit 32 are parallel as shown in FIGS. 30 and 31. By doing this, it is possible to form a cylindrical spacer by attaching two spacers as shown in FIG. 32; thus, it is possible to reduce the members for the optical unit and assemble the optical unit highly precisely.

Figure 26:
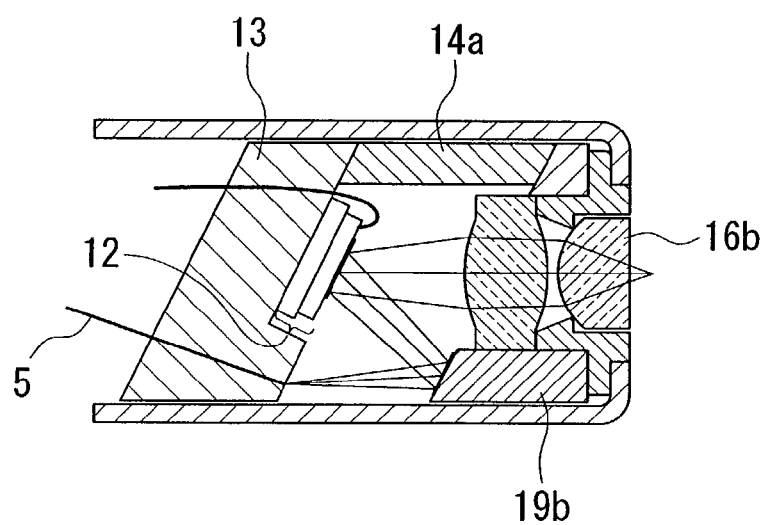
FIG. 26 shows a structure in which modified scanning mirror according to the fourth embodiment is used in an optical system.
Figure 27:
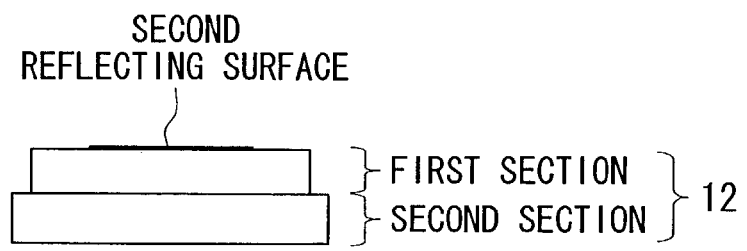
FIG. 27 shows a modified example for a scanning mirror according to the fourth embodiment of the present invention.

Also, similarly to the above modified example, it may be acceptable that the first optical element 19b and the second spacer 14a are formed unitarily so as to form a spacer unit 32 in which both end surfaces are parallel. Also, a gap is formed between the second spacer 14a and the scanning mirror supporting member 13, and the gap is filled by an attaching agent. By doing this, it is possible to realize an optical unit in which inaccuracy in each members are absorbed; thus, highly precise accuracy is realized and the optical unit can be assembled easily. Furthermore, it is possible to form an optical system having two stages in the second optical element 12 as shown in FIG. 27. According to the present embodiment, the second optical element 12 is formed by a first section which is formed by a silicon base board for mounting a reflecting surface thereon and a silicon compound and a second section made of a metal member, a ceramic member, or a glass member which is disposed beneath the first section closely such that the second section is larger than the first section (see FIG. 26).

Figure 14:
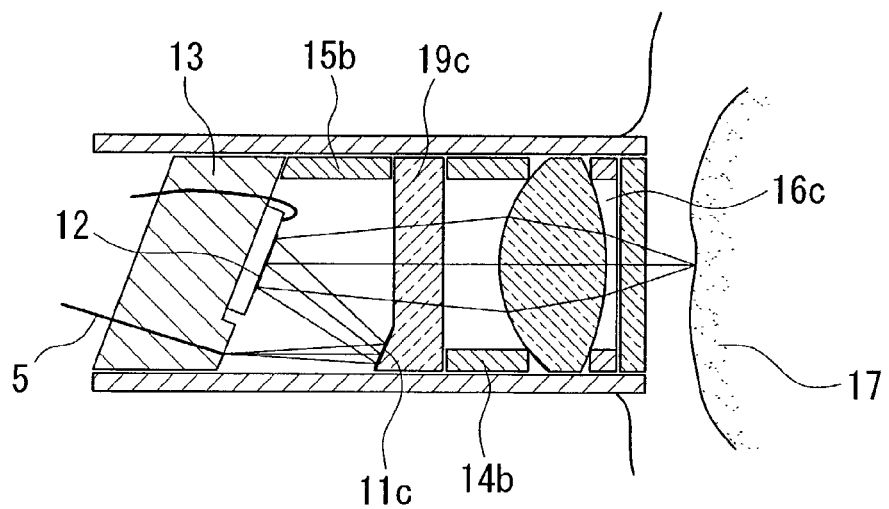
FIG. 14 is a cross section for an optical unit according to a fifth embodiment of the present invention.
Figure 18A:
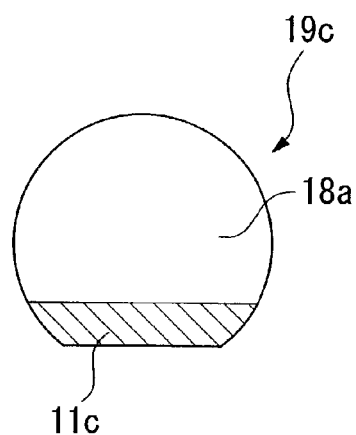
FIGS. 18A and 18B show structures for a first optical element according to the fifth embodiment of the present invention in which a notch is formed on a part of the first optical element.
Figure 18B:
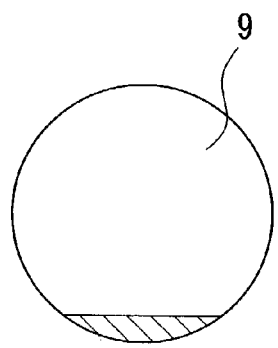

Next, a fifth embodiment of the present invention is explained. FIG. 14 is a cross section of an optical unit which is contained in the endoscope tip section viewed in an optical axis direction according to the present embodiment. According to FIG. 12, the optical unit according to the present embodiment is different from the first embodiment as follows. First, a parallel spacer 14a which is disposed between the scanning mirror supporting member 13 and the parallel flat board 10a according to the first embodiment is modified to a cylindrical spacer 15b which has an inclined surface to the axial direction. Second, the first optical element 19c is disposed so as to be orthogonal to the optical axis in the light condensing optical system 16c, and a fixed mirror section 11x is formed on the inclined surface. Lastly, the cylindrical spacer 15a which supports the parallel flat board 10a and the lens 21a in the light condensing optical system 16a is modified to the parallel spacer 14b. Hereinafter, the same reference numerals are applied to corresponding members as shown in the first embodiment so as to omit the repeated explanation thereof.

In the present embodiment, as shown in FIGS. 15A and 15B, the first optical element 19c has a light transmitting section 18a having a coating for preventing a reflection of light and an inclined surface beneath the light transmitting section 18a having a fixed mirror section having a coating for reflecting a light on a surface of the first optical element 19c and a flat surface on another surface of the first optical element 19c. Here, in the present embodiment, an angle of a normal at the fixed mirror section 11c to the optical axis in the light condensing optical system 16c and an angle of a normal at a balancing position of the scanning mirror 12 are 18° respectively.

Also, in the present embodiment, a cylindrical spacer 15b is disposed between the first optical element 19c and the scanning mirror supporting member 13 as shown in FIG. 17. Also, the spacer 15b supports the first optical element 19c orthogonally to the optical axis. In the cylindrical spacer 15b, as shown in FIG. 17, an inclined surface is formed on an end so as to be diagonal to the axial direction, and an orthogonal surface is formed on another end to the axial direction. In addition, in the cylindrical spacer 15b is provided with a notched section 24 and an opening section 23 such that a light bundle is not blocked between the fixed mirror section 11c and the scanning mirror 12, and between the scanning mirror and the light condensing optical system 16c.

According to the present embodiment, the cylindrical spacer 15b has relatively a sufficient size; thus, it is possible to realize a highly precise surface finish. Also, the parallel spacer 14b is disposed between the first optical element 19c and the lens which forms the light condensing optical system 16c as shown in FIG. 16. Therefore, it is possible to support the first optical element 19c orthogonally to the optical axis highly precisely. Also, the first optical element 19c is disposed to be orthogonal to the optical axis of the light bundle which is directed to the light condensing optical system 16c; thus, an incident angle of a beam which is incident to the light transmitting section 18a in the first optical element 19c becomes acuter than in the case in which the first optical element 19c is disposed diagonally. Therefore, it is possible to prevent the comatic aberration more effectively.

Figure 19:
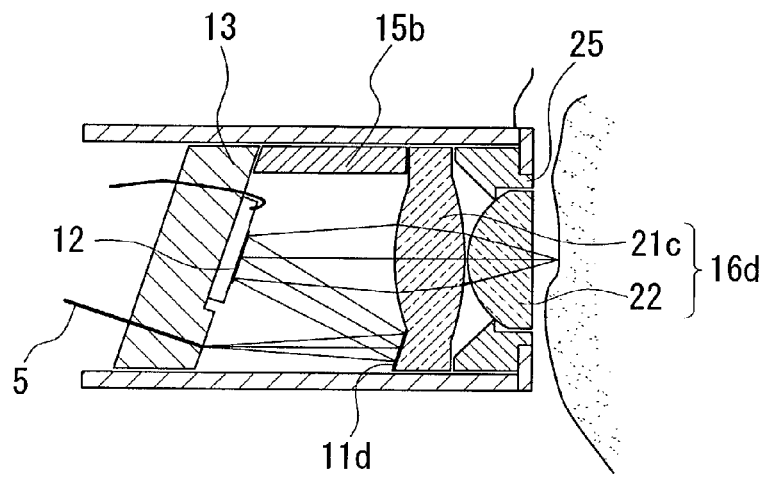
FIG. 19 is a cross section for an optical unit according to a sixth embodiment of the present invention.
Figure 20A:
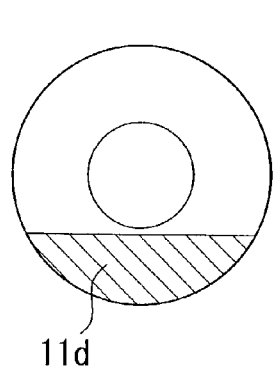
FIGS. 20A and 20B show structures of lenses according to the sixth embodiment of the present invention.
Figure 20B:
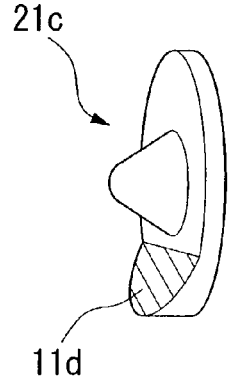

Next, a sixth embodiment of the present invention is explained. FIG. 19 is a cross section of an optical unit which is contained in the endoscope tip section viewed in an optical axis direction according to the present embodiment. According to FIG. 19, the optical unit according to the present embodiment is different from the fifth embodiment as follows. First, the first optical element 19c is omitted and the fixed mirror section 11d is formed in the lens 21c which forms the light condensing optical system 16d. Second, the lens 21c is supported by the cylindrical spacer 15b and a supporting member for supporting a lens 22. Hereinafter, the same reference numerals are applied to corresponding members as shown in the first embodiment so as to omit the repeated explanation thereof According to the present embodiment, a fixed mirror section 11d is formed beneath a light-refracting section in the lens 21c. The fixed mirror section 11d is disposed to be diagonal to an optical axis of the light bundle which is emitted from the optical fiber 5. A light-reflecting coating is formed on a surface of the fixed mirror section 11d as shown in FIGS. 20A and 20B. According to the present embodiment, an angle of a normal at the fixed mirror section 11d to the optical axis in the light condensing optical system and an angle of a normal at a balancing position of the scanning mirror 12 are 17° respectively. A cylindrical spacer 15b is disposed between the lens 21c and the scanning mirror supporting member 13. Also, the lens supporting member 25 is disposed between the lens 21c and the lens 22. The lens 21c is supported orthogonally to the optical axis of the light bundle which is directed to the light condensing optical system 16d. Here, the lens 21c is produced by a molding operation; thus, it is possible to realize a highly precise flatness in the first reflecting section 11d.

The first optical element 19b and the parallel spacer 14b which supports the light condensing optical system 16c which are contained in the fifth embodiment are not contained in the present embodiment; therefore, it is possible to reduce the members for forming the optical unit and improve the efficiency in assembling the optical unit. Also, the fixed mirror section 11d and the lens 21c which forms the light condensing optical system 13 are formed unitarily; therefore, it is possible to improve a positioning accuracy of the optical axis and angle. Furthermore, it is not necessary to dispose the parallel spacer 14b between the first optical element 19b and the light condensing optical system 16c which are contained in the fifth embodiment; therefore, it is possible to dispose the scanning mirror 12 and the fixed mirror section 11d closer each other.

Also, it is possible to dispose the scanning mirror 12 and the light condensing optical system 16d closer each other; therefore, it is possible to maintain a height of the beam in the light condensing optical system 16c lower when the scanning mirror 12 swings. Therefore, it is possible to restrict the aberration in the beam which enters from thereoutside effectively. Furthermore, it is possible to make the effective diameter of the light condensing optical system 16c smaller; therefore, it is possible to make the outer diameter of the entire optical unit smaller and the length of the light condensing optical system 16c in a parallel direction (longitudinal direction) to the optical axis direction shorter.

The present invention contains following features described as supplemental features in the present invention.

Supplemental Feature 1. A compact optical unit comprising:
a light emitting section for emitting a light;
a first optical element having a first reflecting section for reflecting a light which is emitted from the light emitting section;
a second optical element having a second reflecting section which is disposed to face the first optical element; and
a light condensing optical system for condensing a light, wherein
the first reflecting section and the second reflecting section are disposed so as to be diagonal to an optical axis of a light which is incident to the first reflecting section and the second reflecting section; and
a light transmitting section is disposed in the first optical element for transmitting a light which is reflected by the second reflecting section so as to be incident to the light condensing optical system.

Supplemental Feature 2. A compact optical unit according to the supplemental feature 1 further comprising:
a second optical element supporting member for supporting the second optical element;
a first spacer for supporting the light condensing optical system and the first optical element;
a second spacer for supporting the first spacer and the second optical element supporting member; and
a cover member for covering the outside of the first spacer and the outside of the second spacer.

Supplemental Feature 3. A compact optical unit according to the supplemental feature 2 wherein:
the light emitting section is a tip of the optical fiber;
the second optical element supporting member supports the optical fiber in a direction diagonal to an axial direction of an outer shape of the second optical element supporting member.

Supplemental Feature 4. A compact optical unit according to the supplemental feature 2 or 3 wherein the first optical element and the first spacer are formed as a unit.

Supplemental Feature 5. A compact optical unit according to the supplemental feature 2 or 3 wherein:
a spacer unit is formed by attaching the first optical element and the second spacer; and
surfaces on both ends of the spacer unit are parallel each other.

Supplemental Feature 6. A compact optical unit according to the supplemental feature 5, wherein
a gap is formed between the second spacer and the second optical element supporting member; and
an attaching agent is filled in the gap.

In the present invention having the above supplemental features, the optical unit is assembled such that the attaching agent is filled in the gap; therefore, it is possible to assemble the entire optical unit precisely by compensating the inaccuracy of the dimension in each member for forming the optical unit.

Supplemental Feature 7. A compact optical unit according to any one of the supplemental features 1 to 6 wherein the second reflecting section swings by a driving section which is disposed thereoutside.

Supplemental Feature 8. A compact optical unit according to the supplemental feature 8 wherein:
the second optical element is connected to a reference potential wiring which supplies a reference potential for the driving section which drives the second reflecting section and an X-axis driving signal wiring and a Y-axis driving signal wiring which supply the driving voltage to each axes; and
the cover member is connected to the reference potential wiring.

Supplemental Feature 9. An optical scanning probe which is provided with the compact optical unit according to the supplemental feature 8 on a tip of the optical scanning probe, wherein the X-axis driving signal wiring and the Y-axis driving signal wiring are connected each other via the reference potential wiring and a resistance.

Supplemental Feature 10. An optical scanning unit which is provided with the optical scanning probe described in the supplemental feature 9 on a tip of the optical scanning unit wherein an electronic circuit for supplying the driving signal and the reference potential is disposed in a probe grip.

In the present invention having the above supplemental features, the electronic circuit for supplying the driving signal and the reference potential is disposed in a probe grip; therefore, it is possible to form the entire optical unit without inconvenience from a spatial point of view. Although there is a concern in that the electronic circuit is broken due to the static electricity while the device is stored under condition that the electronic circuit is disposed in the device it self, such a concern can be solved by disposing the electronic circuit in a probe grip in the optical scanning probe.

Supplemental Feature 11. A compact optical unit described in any one of the supplemental features 1 to 10 wherein the first optical element is larger than a total area containing an area of a bundle of light which transmits the first optical element and an area for reflecting a light in the first reflecting section.

Supplemental Feature 12. A compact optical unit described in any of the supplemental features 1 to 11 wherein the light transmitting section in the first optical element is an opening section.

Supplemental Feature 13. A compact optical unit described in the supplemental feature 12 wherein;
the first optical element is formed in cylindrical shape;
an inclined surface which is diagonal to the axial direction is provided on an end surface of the first optical element; and the first optical element has the first reflecting section on the inclined surface which contains a range in which a light which comes from thereoutside is incident.

According to the present invention, the first optical element has an inclined surface which is diagonal to an axial direction in the cylindrical structure on an end surface of the first optical element, and the first reflecting section is formed on the inclined surface; it is possible to reduce members for forming the optical system and maintain the positioning relationship in the optical system highly precisely.

Supplemental Feature 14. A compact optical unit described in the supplemental feature 13 wherein the first optical element is disposed so as to fit an outer periphery of the lens which forms a part of the light condensing optical system in the first optical element.

According to the present invention, the first optical element is disposed so as to fit an outer periphery of the lens which forms a part of the light condensing optical system in the first optical element; therefore, it is possible to maintain the positioning relationship of the first optical element and the light condensing lens highly precisely.

Supplemental Feature 15. A compact optical unit described in any one of the supplemental features 2 to 12 wherein:

the first optical element is a parallel flat board;

the first spacer having a cylindrical shape is sandwiched between the first optical element and the light condensing optical system;

an inclined surface which is diagonal to the axial direction is disposed on an end surface of the spacer;

the first optical element is fixed on the inclined surface.

In the present invention, the first optical element is a parallel flat board which has the first reflecting section and the opening section. The spacer having a cylindrical shape is provided with an inclined surface on an end surface of the spacer which is disposed diagonally to the axial direction. The spacer is sandwiched by the first optical element and the light condensing optical system. The first optical element is supported by the spacer having a cylindrical shape. Therefore, it is possible to support the first optical element and the light condensing optical system stably.

Supplemental Feature 16. A compact optical unit described in the supplemental feature 15 wherein the parallel flat board is formed by a light-transmitting member on which a coating for reflecting a light is formed in an area including a range in which a beam from the light emitting section is incident.

In the present invention, a reflecting section is formed by a coating for reflecting a light on the parallel flat board, there are fewer cases in which a problem in that a notched section is formed than in a case in which a light-reflecting section is disposed separately.

Supplemental Feature 17. A compact optical unit described in the supplemental features 15 or 16 wherein:

an end surface of the first spacer is orthogonal to the axial direction;

a part of lenses which form the light condensing optical system have an flat surface section which is orthogonal to the optical axis in the outside of an effective range of the lenses; and the flat surface section is fixed on an orthogonal surface of the spacer.

In the present invention, the flat surface section which is orthogonal to the optical axis in the lenses which form the light condensing optical system is fixed on an end surface of the spacer having a cylindrical shape; therefore, it is possible to position the lenses in the light condensing optical system highly precisely such that the lenses in the light condensing optical system are disposed orthogonal to the optical axis of a light which is reflected from the second reflecting section.

Supplemental Feature 18. A compact optical unit described in any one of the supplemental features 2 to 15 having a second optical element supporting member for supporting the second optical element wherein an inclined surface which is disposed diagonal to the axial direction on an end surface of the second optical element supporting member.

Supplemental Feature 19. A compact optical unit described in the supplemental feature 18 wherein the second optical element supporting member and the first optical element having the first reflecting section are supported by the spacer having surfaces which are parallel each other.

Supplemental Feature 20. A compact optical unit described in any one of the supplemental features 1 to 12 and 15 wherein an inclined surface of the second optical element supporting member for supporting the second optical element is parallel with an end surface of the light emitting section.

In the present invention, the second optical element is supported by the second spacer. A surface of the second spacer and an end surface of the light emitting section are parallel. In addition, the first optical element and the second optical element are supported in parallel. Therefore, it is possible to dispose an optical axis which is directed from the light emitting section to the first reflecting section and an optical axis which is directed from the second reflecting section to the light condensing optical system in parallel. Thus, it is possible to form a highly precise optical system.

Supplemental Feature 21. A compact optical unit described in any one of the supplemental features 1 to 11 wherein the first reflecting section is formed in a part of the lenses which form the light condensing optical system.

Supplemental Feature 22. A compact optical unit described in the supplemental feature 21 wherein the first reflecting section is formed in an outside of a refracting section in the lens.

Supplemental Feature 23. A compact optical unit described in any one of the supplemental features 1 to 12, 15, and 22 wherein a member for supporting the light emitting section and a member for supporting the second optical element are formed unitarily.

In the present invention, a member for supporting the light emitting section and a member for supporting the second optical element are formed unitarily; thus, it is possible to maintain a parallelism between an end surface of the light emitting section and a surface of the second supporting member precisely.

Supplemental Feature 24. A compact optical unit described in any one of the supplemental features 1 to 11 wherein the light emitting section in the first optical element is approximately orthogonal to the optical axis in the light condensing optical system.

In the present invention, the light emitting section in the first optical element is approximately orthogonal to the optical axis in the light condensing optical system; therefore, it is possible to restrict a comatic aberration on the subject.

Supplemental Feature 25. A compact optical unit described in any one of the supplemental features 1 to 24 wherein the light emitting section is a pinhole.

In the present invention, the light emitting section is a pinhole; thus, it is possible to form a confocal optical system by such a structure.

Supplemental Feature 26. A compact optical unit described in any one of the supplemental features 1 to 25 wherein the light emitting section is an end surface of the optical fiber.

In the present invention, the light emitting section is an end surface of the optical fiber; thus, it is possible to form a spotlight source by such a structure.

Supplemental Feature 27. A compact optical unit described in any one of the supplemental features 1 to 26 wherein the light emitting section serves as a light-introducing section.

Supplemental Feature 28. A compact optical unit described in any one of the supplemental features 25 to 27 wherein the optical system in the optical unit is a confocal optical system.

Supplemental Feature 29. A compact optical unit described in any one of the supplemental features 1 to 28 wherein a surface which forms the second reflecting surface and an end surface of the light emitting section are in parallel.

Supplemental Feature 30. A compact optical unit described in any one of the supplemental features 1 to 29 wherein a surface of the second optical element supporting member on which the second optical element is disposed and an end surface of the light emitting section are aligned.

In the present invention, a surface on which the second optical element is disposed and an end surface of the light emitting section is aligned; therefore, it is possible to improve a surface finish because surface finish operation becomes easier.

Supplemental Feature 31. A compact optical unit described in any one of the supplemental features 1 to 30 wherein the optical unit is disposed in a tip of the endoscope.

Supplemental Feature 32. An optical scanning probe which is provided with the compact optical unit on a tip of the optical scanning probe described in any one of the supplemental features 1 to 8, or 11 to 31 wherein the optical scanning probe can be flexibly inserted in a channel of the endoscope.

The embodiments of the present invention are explained above with reference to the drawings. It should be understood that the drawings and detailed description thereto are not intended to limit the invention to the particular form disclosed. It should also be understood that the invention is to cover all modifications, equivalents and alternatives falling within the scope of the present invention as defined by the claims. For example, in the above explanation, although it is explained that the parallel spacer according to the first to fourth embodiments and a cylindrical spacer according to the sixth embodiment have an opening section and a notched section, it is acceptable that the spacer does not have the notched section unless the spacer blocks a light bundle which transmits therethrough.

Also, in the embodiments of the present invention, a position of the optical axis of the light bundle which is directed from the second reflecting section to the light condensing optical system is not specifically defined. However, it is described that a member which is called as the first optical element is supported such that two members sandwiches the upper section of the first optical element in any embodiments of the present invention. Such a part does not have an optical function; thus, it may be acceptable that a different optical element is disposed in a position which is eccentric to a center of the first optical element so as to make an entire diameter of the optical unit smaller (see FIG. 13B).

Also, a member for forming the optical fiber 5 is not specifically defined in the first embodiment. Here, it is possible to use a single mode fiber or a multi-mode fiber as long as the fiber has a characteristics for a confocal optical system. Also, for an area on the parallel flat board 10a on which a reflecting coating is formed, it is sufficient if such an area does not interfere with an area of the above light transmitting section 18a on a flat surface of the parallel flat board 10a and a predetermined light-reflecting section is included. Therefore, various modifications shown in FIGS. 3A to 3C can be proposed. Also, it is acceptable if a shape of the light-reflecting section is polygonal. Here, in the first embodiment, it is described that a driving method for a scanning mirror is a static electric driving method by making use of a Gimbal structure. However, the embodiments in the present invention is not limited to such methods; thus, it is possible to use a method in which a galvano-mirror is used or a mirror of which angle is controlled by an magnetic force.

Also, the parallel flat board according to the second embodiment and the flat section on the first optical element having an opening section according to the third embodiment may formed such that a reflecting-coating is formed on an entire surface of the flat board except the opening section. Also, the reflecting coating may be formed partly on a reflecting area. Also, for a member for the parallel flat board according to the second embodiment, any members can be used as long as a fixed mirror section has a mirror-surface.

Furthermore, in the fifth embodiment, the explanation is made for a case in which a light transmitting section is disposed which is made such that a reflection preventing coating is formed on the first optical element. The present invention is not limited to such a structure and it is acceptable that the light transmitting section is an opening section similarly to the second embodiment. Also, in the embodiments of the present invention, an explanation is made that outer diameter of the scanning mirror supporting member and the cylindrical spacer is approximately the same as an inner diameter of the endoscope tip section. However, it may be acceptable that stages are formed in the endoscope tip section and a notched section is disposed in the scanning mirror supporting member and the cylindrical spacer so as to improve the efficiency in the assembly of the optical unit.

In the present invention, the light transmitting section and the first reflecting section are formed unitarily in the first optical element; therefore, it is possible to dispose a larger element than in a case in which only a light reflecting section is disposed. Also, the first optical element and the second optical element are disposed so as to be diagonal to an incident light; therefore, it is possible to reduce a noise light composition which is caused because a light is reflected at the lens surface and a reflecting surface and returns to the optical fiber in the optical system.

Also, in the present invention, the first spacer, the second spacer, and the cover for covering these spacer are disposed; thus, it is possible to assemble the optical system highly precisely.

In the present invention, a member for supporting the second optical element serves as a member for supporting an optical fiber; therefore, it is possible to reduce the members for forming the optical unit so as to make the optical unit smaller. Also, an end surface of the optical fiber is ground diagonally; therefore, a Fresnel-reflection does not return to the optical fiber; thus, it is possible to reduce noise caused by the reflected light. Furthermore, a direction of the light which is emitted from the end surface of the optical fiber is parallel to the optical axis direction; therefore, it is possible to use a space therein efficiently.

In the present invention, the first optical element and the first spacer are formed unitarily; therefore, it is possible to reduce the members for forming the optical unit and improve the accuracy in the assembly.

In the present invention, a spacer unit is formed by attaching the first optical element, the first spacer, and the second spacer; thus, it is possible to reduce the members for forming the optical unit. Furthermore, end surfaces on both ends of the spacer are parallel; thus, it is possible to improve the accuracy in the assembly.

In the present invention, the first optical element is larger than a total area containing an area of a bundle of light which transmits the first optical element and an area for reflecting a light in the first reflecting section; therefore, it is possible to realize a surface finish in the first optical element which is necessary for an optical system according to the present invention.

In the present invention, the light transmitting section in the first optical element is an opening section; therefore, a light is not reflected in the opening section; thus, it is possible to realize an optical system in which a comatic aberration is restricted on the subject.

In the present invention, the first optical element is a parallel flat board which has the first reflecting section and the opening section. The spacer having a cylindrical shape is provided with an inclined surface on an end surface of the spacer which is disposed diagonally to the axial direction. The spacer is sandwiched by the first optical element and the light condensing optical system. The first optical element is supported by the spacer having a cylindrical shape. Therefore, it is possible to support the first optical element and the light condensing optical system stably.

In the present invention, the light condensing lens is provided with the first reflecting section; thus, it is possible to improve a positioning accuracy for the first reflecting section and the light condensing optical system.

In the present invention, the second reflecting section swings according to a driving force which is applied by a driving section which is disposed thereoutside; therefore, a scanning position for condensing a light on the subject can be moved horizontally (XY direction) when the second light reflecting section swung horizontally.

In the present invention, a potential at the cover member is set to be a reference potential; therefore, it is possible to remove a magnetic wave noise; thus, it is possible to use the second optical element stably.

In the present invention, the driving signal wirings are connected to the reference potential wirings via the resistances; therefore, an electric charge is discharged via the resistances even if a potential difference occurs by the static electricity. Therefore, there is not a case in which the second optical element wiring is deteriorated.

In the present invention, it is possible to assemble a compact optical system highly precisely; thus, it is possible to insert the optical system in a channel having a small diameter in the endoscope. Also, it is possible to observe an internal organization of a patient at a large magnification. Also, there is an advantage in that it is possible to alleviate a pain which the patient feels when the endoscope enters inside the patient.

As explained above, in the present invention, the optical element is disposed diagonal to the light which is incident; it is possible to prevent the conventional disadvantage in that a light which is reflected at the reflecting surface which is disposed on a surface of the lens or a glass board in the optical system from being returned to the optical fiber as a noise. Thus, there is an advantage in that it is possible to form the optical system which can supply an information with high SN ratio. Also, a part of the optical element has a plurality of functions; therefore, it is possible to make a compact optical unit and improve the efficiency in the assembly and form the optical system highly precisely.

What is claimed is:

1. An optical scanning probe which is provided with a compact optical unit provided on a tip of the optical scanning probe, the compact optical unit comprising:
    a light emitting section for emitting a light;
    a first optical clement having a first reflecting section for reflecting a light which is emitted from the light emitting section;
    a second optical element having a second reflecting section which is disposed to face the first optical element; and
    a light condensing optical system for condensing the light,
    a second optical element supporting member for supporting the second optical element;
    a first spacer for supporting the light condensing optical system and the first optical element;
    a second spacer for supporting the first optical element and the second optical element supporting member; and
    a cover member for covering the outside of the first spacer and the outside of the second spacer,
    the first reflecting section and the second reflecting section are disposed so as to be diagonal to an optical axis of the light which is incident to the first reflecting section and the second reflecting section,
    a light transmitting section is disposed in the first optical element for transmitting the light which is reflected by the second reflecting section so as to be incident to the light condensing optical system,
    the second optical element is connected to a reference potential wiring which supplies a reference potential for the driving section which drives the second reflecting section and an X-axis driving signal wiring and a Y-axis driving signal wiring which supply the driving voltage to each axes, and
    the cover member is connected to the reference potential wiring,
    wherein the X-axis driving signal wiring and the Y-axis driving signal wiring are connected each other via the reference potential wiring and a resistance.

2. A compact optical unit according to claim 1 wherein:
    the light emitting section is a tip of the optical fiber;
    the second optical element supporting member supports the optical fiber in a direction diagonal to an axial direction of an outer shape of the second optical element supporting member.

3. A compact optical unit according to claim 2 wherein the first optical element and the first spacer are formed as a unit.

4. A compact optical unit according to claim 1 wherein:
    a spacer unit is formed by attaching the first optical element, the first spacer, and the second spacer; and
    surfaces on both ends of the spacer unit are parallel each other.

5. A compact optical unit according to claim 1 wherein the first optical element is larger than a total area containing an area of a bundle of light which transmits the first optical element and an area for reflecting a light in the first reflecting section.

6. A compact optical unit according to claim 1 wherein the light transmitting section in the first optical element is an opening section.

7. A compact optical unit according to claim 1 wherein:
    the first optical clement is formed by a parallel flat board;
    a cylindrical spacer sandwiched between the first optical element and the light condensing optical system;
    a surface diagonal to the axial line is provided on an end surface of the cylindrical spacer; and
    the first optical element is fixed on the surface diagonal to the axial line.

8. A compact optical unit according to claim 1 wherein the first reflecting section is disposed in a part of lenses which form the light condensing optical system.

9. A compact optical unit according to claim 1 wherein the second reflecting section swings by a driving section which is disposed thereoutside.

10. An optical scanning probe according to claim 1, wherein the optical scanning probe can be inserted in a channel in an endoscope flexibly.

11. A compact optical unit comprising:

a light emitting section for emitting a light;

a first optical element having a first reflecting section for reflecting the light which is emitted from the light emitting section;

a second optical element having a second reflecting section which is disposed to face the first optical element;

a light condensing optical system for condensing the light; and a second optical element supporting member for supporting the second optical element, wherein the first reflecting section and the second reflecting section are disposed so as to be diagonal to an optical axis of the light which is incident to the first reflecting section and the second reflecting section, a light transmitting section is disposed in the first optical element for transmitting the light which is reflected by the second reflecting section so as to be incident to the light condensing optical system, and an end surface of the light emitting section is disposed on a surface of the second optical element supporting member.

* * * * *